Sept. 28, 1926.                                                      1,601,009
               H. R. TROTTER
                   GOVERNOR
            Filed Dec. 27, 1924          2 Sheets-Sheet 1

WITNESSES:                               H. R. Trotter
                                            INVENTOR
                                        BY
                                            ATTORNEY Patented Sept. 28, 1926.

1,601,009

UNITED STATES PATENT OFFICE.

HENRY R. TROTTER, OF MORTON, PENNSYLVANIA, ASSIGNOR TO WESTINGHOUSE ELECTRIC & MANUFACTURING COMPANY, A CORPORATION OF PENNSYLVANIA.

GOVERNOR.

Application filed December 27, 1924. Serial No. 758,415.

My invention relates to variable fluid pressure operated governing apparatus for prime movers and has for its object the provision of apparatus of the character designated which shall be relatively simple of design, easy of manufacture and which shall be capable of effecting close regulation of the machine governed.

More specifically the object of my invention is to provide a variable fluid pressure operated governing apparatus embodying an element movable in response to variations in the fluid pressure in opposition to the force exerted by a spring and wherein comparatively wide governing movements are effected per unit of deflection of the spring.

Figure 1:
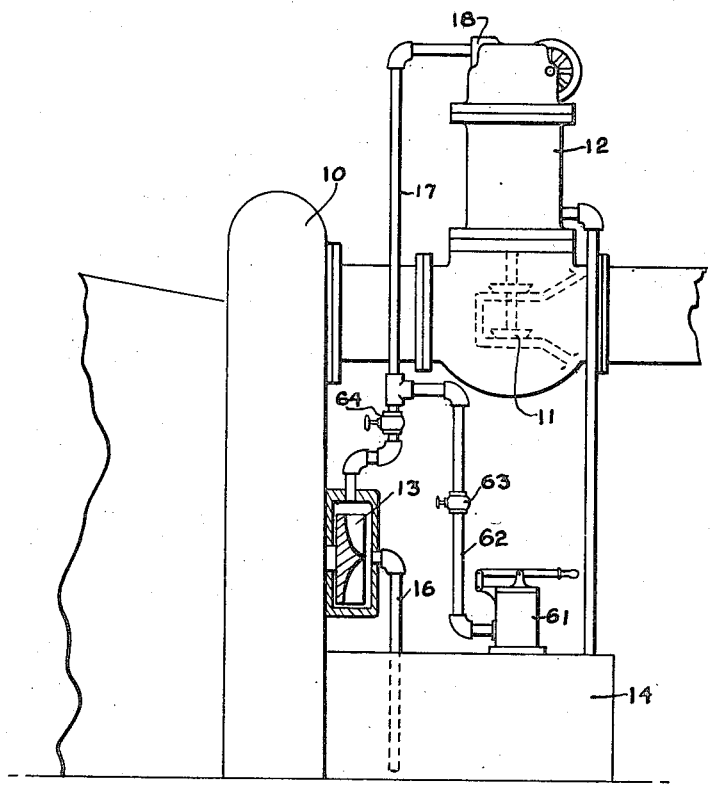
Figure 2:
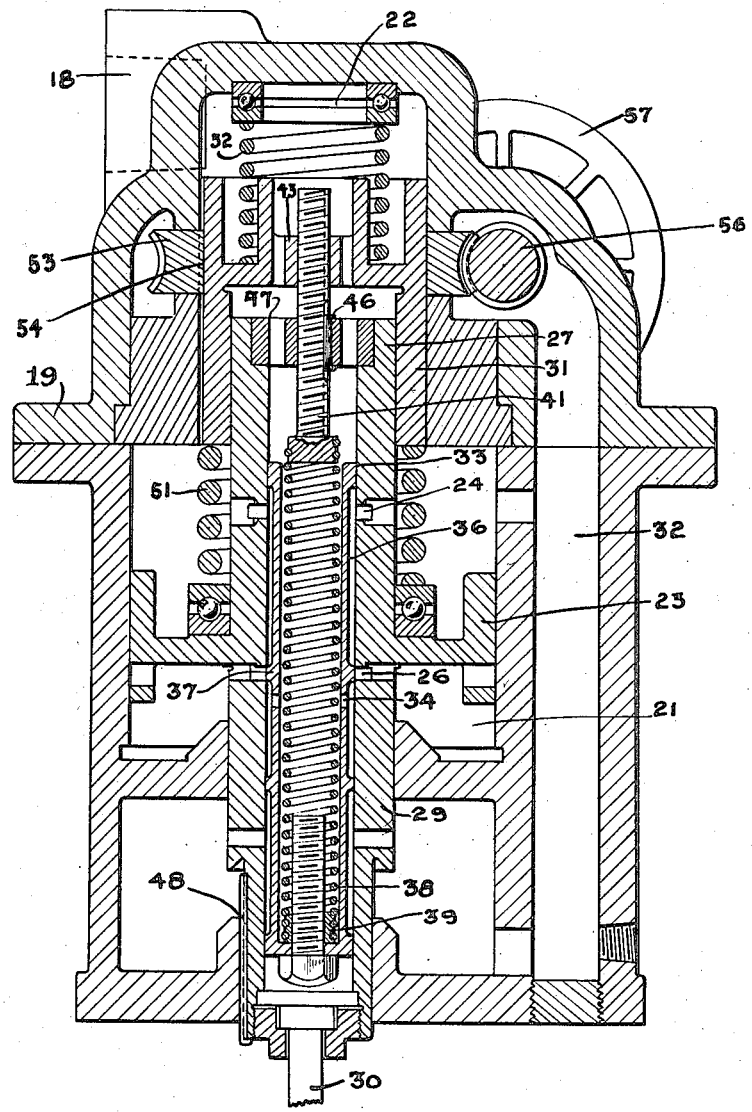

These and other objects are obtained by apparatus made in accordance with my invention and illustrated in the accompanying drawings forming a part of this specification in which Fig. 1 is a view showing an elastic fluid turbine having my improved governing apparatus applied thereto, and Fig. 2 is a vertical sectional view of the governing apparatus.

As is well understood in the art to which my invention relates, variable fluid pressure operated governing apparatus embodying an element movable in response to variations in the fluid pressure in opposition to the force exerted by a spring, is only capable of a very limited governing movement per unit of deflection of the spring except when a spring of inordinate length and size is employed. Various schemes have been proposed providing a movable abutment for the spring and providing linkage of some sort whereby the abutment is caused to move upon deflection of the spring, thereby multiplying movements of the element per unit of deflection of the spring.

In accordance with my invention, I provide an element movable in response to variations in fluid pressure in opposition to the force exerted by the spring. The spring is secured to a floating abutment which is in turn supported by a second spring or springs movable with the element. Upon a change in the governing fluid pressure, the spring secured to the element deflects and the element moves, whereupon the floating abutment also moves in the same direction but to a lesser degree, thereby effecting a governing movement which is greater than the deflection of the spring opposing the variable fluid pressure.

Refering now to the drawings for a more detailed description of my invention, I show in Fig. 1, at 10, an elastic fluid turbine having an admission valve 11 controlled by my improved governing apparatus 12. The governing appartus 12 is actuated by fluid under pressure varying as a function of the speed of the turbine 10, developed by an impeller pump 13 driven directly by the turbine 10. Fluid for the pump 13 is supplied from any convenient source, as from a reservoir 14 through a conduit 16, and is delivered to the governing apparatus 12 through a conduit 17, connected to the governor housing at 18.

The governing apparatus 12 embodies a housing 19 defining an operating cylinder 21 and a supply chamber 22. The supply chamber 22 communicates with the pump 13 through the connection 18. Disposed within the operating cylinder 21 is an operating piston 23 actuated by the fluid pressure. The operating piston 23 is made hollow and has upper and lower ports 24 and 26, respectively, leading from the exterior to the interior thereof. The operating piston 23 is also provided with upper and lower stem portions 27 and 29, respectively. The lower stem portion 29 is connected through a stem 30, to the admission valve 11 so that movements of the operating piston are transmitted directly to the admission valve. The upper stem portion 27 extends into the supply chamber 22 and is at all times subjected to the fluid under pressure supplied by the impeller pump 13. The upper stem portion 27 operates within a cylindrical bushing 31 with which it makes a sliding fit approximately fluid-tight. The cylindrical bushing 31, in turn, is provided with a sliding fit with a wall of the supply chamber 22 so as to be approximately fluid-tight. The upper side of the operating piston 23 is connected at all times to a drain passage 32, while the lower side thereof may be subjected, at times, to the variable fluid pressure. The area of the piston 23 being greater than the area of the upper stem portion 27, upon the admision of fluid pressure to the under side of the piston 23, it is caused to move upwardly in opposition to the pressure existent within the supply chamber 22.

For controlling the operating piston 23 there is provided a hollow piston pilot valve 33 positioned within the operating piston 23, the hollow of the operating piston 23 defining a cylinder for the pilot valve 33. The pilot valve 33 is provided with ports 34—34 which, when in registry with the lower ports 26 of the operating piston 23, admit fluid under pressure to the under side of the piston 23, forcing it upwardly. The pilot valve 33 is also provided with a reduced portion 36 which is at all times in communication with the upper ports 24 of the operating piston and is adapted to place the upper and lower ports 24 and 26 in communication, permitting fluid beneath the operating piston 23 to pass to the upper side thereof and thence to the exhaust through the drain 32. Between the reduced portion 36 and the ports 34 of the pilot valve 33 is an annular shoulder 37 which, when in registry with the lower ports of the operating piston 23, prevents the admission to, or exhaust of fluid from beneath the piston 23, whereupon it is held stationary by the force of the fluid pressure within the supply chamber 22 and the fluid trapped beneath it. The variable fluid pressure acting against the pilot valve 33 tends at all times to force it downwardly. The force of the variable fluid pressure is opposed by a spring 38 secured to a suitable anchor 39 at the lower end of the pilot valve 33 and having its opposite end secured to a bolt 41 which is supported by the cylindrical bushing 31, the action of which will be more particularly described later.

The operation of the apparatus so far described is as follows: Fluid under pressure varying with the speed of the turbine 10 is developed by the pump 13 and delivered to the governing apparatus 12 at 18, into the supply chamber 22 where it acts against the upper stem portion 27 of the operating piston 23, tending to force it downwardly and force the admission valve 11 in a closing direction. The fluid under pressure also passes down into the interior of the pilot valve 33, tending to force it downwardly, said force being resisted by the spring 38. Assume that the turbine 10 is running under normal load condition with normal speed and that the position of the pilot valve and operating piston is as illustrated in Fig. 2. Upon a change in speed of the turbine 10 such, for example, as an increase in speed, the fluid governing pressure increases and the pilot valve 33 is forced downwardly, whereupon the reduced portion 36 of the pilot valve 33 connects the upper and lower ports 24 and 26 of the piston 23, allowing fluid to escape from beneath the piston 23 as already described, whereupon the fluid pressure within the supply chamber 22 acting against the upper stem portion 27 of the piston 23 moves it downwardly until the lower ports 26 are again covered by the annular shoulder 37 of the pilot valve 33. No more fluid can now escape from beneath the piston 23 and the piston 23 is held stationary by the fluid pressure within the supply chamber 22 acting against the upper stem portion 27 and by the fluid trapped beneath the piston 23 by the annular shoulder 37. Upon a decrease in governing fluid pressure the spring 38 causes the pilot valve 33 to move upwardly whereupon fluid under pressure passes through the ports 34 and 26 to the cylinder 21 beneath the piston 23, forcing it upwardly. The piston 23 continues to move upwardly until the annular shoulder 37 again covers the lower ports 26 and no further governing movement occurs until there is a further change in governing fluid pressure.

From the foregoing it will be apparent that for every movement of the pilot valve 33 there is a compensating and equal movement of the operating piston 23 and that the operating piston 23 follows the movements of the pilot valve 33. It will also be apparent, unless some mechanism is provided for multiplying the effect of the deflection of the spring 38, that the only governing movement obtained for the apparatus will be that determined by the deflection of the spring 38 per unit of change in governing fluid pressure. The mechanism which I employ for multiplying the effect of deflections of spring 38 will now be described. The spring 38, as heretofore pointed out, is secured at its upper end to a bolt 41. The bolt 41 is supported by the cylindrical bushing 31 from a suitable web member 43 and is in threaded relation therewith. The bolt 41 is prevented from turning by means of a key and slot connection 46 with a web member 47 secured to the upper stem portion 27 of the operating piston 23. The operating piston 23, in turn is prevented from rotating by means of a sliding connection 48 between the lower stem portion 29 and the governor housing.

The cylindrical bushing 31 which serves as an abutment for the spring 38, is free to move longitudinally in the supply chamber 22. In order to support the bushing 31 in the supply chamber 22 I provide a spring 51 disposed between the upper side of the piston 23 and the lower end of the cylindrical bushing 31. Inasmuch as the force of the fluid pressure within the supply chamber 22 acts to force the bushing 31 downwardly and the spring 38 is suspended from the bushing 31, it will be seen that the spring 51 is at all times in compression. I also provide a second spring 52 positioned between the upper side of the bushing 31 and the top of the governor housing. The spring 52 is also in compression and tends to force the bushing 31 downwardly and imposes an additional load upon the spring 51. The spring 52 is not required to be of the same strength as the spring 51 as it does not carry the same load.

In order that the initial tension and load carried by the spring 38 may be varied, I provide means for rotating the cylindrical bushing 31. To this end I provide a gear 53, connected to the cylindrical bushing 31 by means of a sliding key 54. The gear 53 meshes with a worm 56 which may be rotated by any suitable means as by a hand wheel 57 without the governor housing. Upon rotation of the worm 56 the cylindrical bushing 31 is rotated by the gear 53 and inasmuch as the bolt 41 is in threaded relation with the web 43 and is held against rotation by the sliding key 46, it is raised or lowered upon rotation of the bushing 31 and the initial tension of the spring 38 is thereby varied.

The operation of apparatus made in accordance with my invention will be apparent. Assume that the turbine 10 is running at normal speed with the governor parts in the position shown in Fig. 2 and that a decrease in load with a consequent increase in speed occurs. Upon an increase in speed the governing fluid pressure increases and the pilot valve 33 moves downwardly elongating the spring 38. Upon movement of the pilot valve 33 the piston 23 follows in a manner already described. Upon downward movement of the operating piston 23 it takes with it the spring 51 and the cylindrical bushing 31. As the cylindrical bushing 31 moves downwardly the spring 52 elongates thereby decreasing the load upon the spring 51. As the load upon the spring 51 imposed by the spring 52 decreases, the spring 51 elongates sufficiently to pull the pilot valve 33 back to lap position as shown in the drawing.

Upon a decrease in speed of the turbine 10 and a decrease in governing fluid pressure, the spring 38 pulls the pilot valve 33 upwardly followed by the piston 23 in a manner already described. As the piston 23 moves upwardly it moves the cylindrical bushing 31 upwardly through the spring 51. Upward movement of the bushing 31 further compresses the spring 52, imposing an additional load upon the spring 51 so that it compresses sufficiently to bring the pilot valve 33 back to lap position.

It may thus be seen that upon a change in governing fluid pressure the effective governing movement derivable from my improved apparatus is the initial deflection of the spring 38 plus whatever movement is required by the cylindrical bushing 31 to shift the load between the springs 51 and 52 necessary to compensate for the change in governing fluid pressure. It will also be apparent that the designer of apparatus made in accordance with my invention may, by a varied selection of weight and scale of the springs 51 and 52, produce apparatus having the required range of governing movement per unit of change in governing pressure for any particular installation.

In the event there should be a failure in governing fluid pressure, due to breakage of fluid conduits, or otherwise, the force of the springs 51 and 52 act to push the piston 23 downwardly and the admission valve 11 to a closed position.

Inasmuch as the apparatus acts, under condition of no pressure, to hold the admission valve 11 closed, it will be obvious that some mechanism is required to open the admission valve 11 when it is desired to start the turbine. To this end I show a pump 61 in Fig. 1 which may be manually operated when the turbine 10 is at rest to generate pressure for opening the admission valve 11. The pump 61 discharges fluid through a conduit 62 to the conduit 17 and thence to the governing apparatus 12. In order to cut off the pump 61 from the conduit 17 when the pump 13 is operating I provide a valve 63 in the conduit 62. Similarly I provide a valve 64 to cut off the pump 13 from the conduit 17 when the pump 61 is operating.

From the foregoing it will be apparent that I have invented an improved governing apparatus, which is compact, simple of design, easy of manufacture, and capable of close regulation of the unit governed.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a variable fluid pressure operated governing apparatus, the combination of a pilot valve movable in response to variations in fluid pressure, a spring associated with the pilot valve for opposing the variable fluid pressure, an abutment for the spring, a piston controlled by the valve and following its movements, and flexible means associated with the piston for supporting the abutment.

2. In a variable fluid pressure operated governing apparatus, the combination of a housing defining an operating cylinder and a supply chamber connected to the source of variable fluid pressure, an operating piston within the operating cylinder, resilient means disposed between the operating piston and the opposing end of the housing, a pilot valve subjected on one side to the variable fluid pressure for controlling the operating piston, a spring associated with the pilot valve and opposing the variable fluid pressure, and an abutment for the spring supported at an intermediate point of the resilient means.

3. In a variable fluid pressure operated governing apparatus, the combination of a hollow piston valve subjected to the variable fluid pressure, a hollow operating piston defining a cylinder for the piston valve, said operating piston being controlled by the piston valve and following its movements, resilient means associated with the operating piston and deflecting upon movements thereof, a spring connected to one end of the piston valve for opposing the variable fluid pressure, and an abutment for the spring supported at an intermediate point of the resilient means.

4. In a governing apparatus for a prime mover having an admission valve, the combination of means for developing fluid pressure varying as a function of the speed of the prime mover, an operating piston actuated by the variable fluid pressure for controlling the admission valve, a pilot valve movable in response to variations in the fluid pressure in opposition to the force exerted by a spring controlling the operating piston, said operating piston having movements equivalent to the movements of the pilot valve, an abutment for the spring, and resilient means deflecting with movements of the operating piston for supporting the abutment.

5. In a governing apparatus for a prime mover having an admission valve, the combination of means for developing fluid pressure varying as a function of the speed of the prime mover, an operating piston actuated by the variable fluid pressure for controlling the admission valve, resilient means associated with the operating piston and flexing upon movements thereof, a pilot valve movable in response to variations in the fluid pressure for controlling the operating piston, said operating piston having movements equivalent to the movements of the pilot valve, a spring associated with the pilot valve for opposing the variable fluid pressure, an abutment for the spring, said abutment being supported at an intermediate point of the resilient means, and means for varying the tension of the spring.

6. In a governing apparatus for a prime mover having an admission valve, the combination of means for developing fluid pressure varying as a function of the speed of the prime mover, an operating piston actuated by the variable fluid pressure for controlling the admission valve, resilient means associated with the operating piston and flexing upon movements thereof, a pilot valve movable in response to variations in the fluid pressure for controlling the operating piston, said operating piston having movements equivalent to the movements of the pilot valve, a spring associated with the pilot valve for opposing the variable fluid pressure, an abutment for the spring, said abutment being supported at an intermediate point of the resilient means, and means without the governing apparatus for varying the tension of the spring.

7. In a variable fluid pressure operated governing apparatus for a prime mover having an admission valve, a housing defining an operating cylinder and a supply chamber, said supply chamber being connected to the source of variable fluid pressure, an operating piston within the operating cylinder for controlling the admission valve, resilient means in compression between the operating piston and the opposing end of the housing, said resilient means exerting a force upon the operating piston in a direction for closing the admission valve, a pilot valve subjected on one side to the variable fluid pressure for controlling the operating piston, a spring associated with the pilot valve and opposing the variable fluid pressure, and an abutment for the spring supported at an intermediate point of the resilient means.

In testimony whereof, I have hereunto subscribed my name this eighteenth day of November, 1924.

HENRY R. TROTTER.